(12) United States Patent
Kinnanen

(10) Patent No.: US 6,505,881 B2
(45) Date of Patent: Jan. 14, 2003

(54) ROOF OF A CONVERTIBLE

(75) Inventor: Matti Kinnanen, Laitila (FI)

(73) Assignee: Valmet Automotive Oy, Uusikaupunki (FI)

( * ) Notice: Subject to any disclaimer, the term of this patent is extended or adjusted under 35 U.S.C. 154(b) by 0 days.

(21) Appl. No.: 10/090,631

(22) Filed: Mar. 6, 2002

(65) Prior Publication Data
US 2002/0125733 A1 Sep. 12, 2002

(30) Foreign Application Priority Data
Mar. 8, 2001 (DE) .......................... 101 11 207

(51) Int. Cl.<sup>7</sup> ................................. B60J 7/14
(52) U.S. Cl. ................. 296/107.17; 296/108; 296/116; 296/117
(58) Field of Search ............................ 296/107.17, 108, 296/116, 117

(56) References Cited

U.S. PATENT DOCUMENTS 6,422,637 B1 * 7/2002 MacFarland ....... 296/107.17 X

2001/0045759 A1 * 11/2001 Russke .................. 296/107.17

FOREIGN PATENT DOCUMENTS

| DE | 43 16 485 | * 11/1994 |
| EP | 0 835 778 | 4/1998 |
| EP | 0 835 779 | 4/1998 |

* cited by examiner

Primary Examiner—Joseph D. Pape
(74) Attorney, Agent, or Firm—Young & Thompson

(57) ABSTRACT

Roof (1) of a convertible, divided into three substantially rigid roof sections, a forward roof section (2), a middle roof section (3) and a rearward roof section (4), hinged on each other in succession in the longitudinal direction of the vehicle and arranged to be movable between a closed position (I) and an opened position (II). The rearward roof section (4) is pivotally connected to the body so as to be turnable by means of a main actuator (7). The middle roof section (3) is pivotally connected to the rearward roof section (4) and connected via a mechanical pivoted lever system (8) to the body and the rearward roof section of the convertible so that the middle roof section is turned by positive control together with the rearward roof section when the roof is being turned between the closed position (I) and the opened position (II).

20 Claims, 4 Drawing Sheets

ROOF OF A CONVERTIBLE

BACKGROUND OF THE INVENTION

The present invention relates to a roof of a convertible as defined in the preamble of claim 1.

In prior art, specification EP 0835779 A1 presents a convertible roof divided into three substantially rigid roof sections, which are hinged on each other as a successive array in the longitudinal direction of the vehicle. Dividing the roof into three roof sections in the longitudinal direction of the vehicle is in itself an advantageous solution because the roof stowage space behind the passenger compartment thus takes up less of the trunk space of the vehicle, or if the trunk space is reduced, then the rear of the vehicle may be made shorter.

In the prior-art roof, the forward roof section, middle roof section and rearward roof section are constructed to be movable between a closed position and an open position. The free end of the forward roof section is provided with locking means to allow it to be fastened to the windscreen bar, which is a fixed part of the body, extending transversely between the A-pillars. In the closed position, the roof sections cover the passenger compartment of the convertible. In the open position, the roof has been folded down from its position over the passenger compartment into a roof stowage space behind the passenger compartment, the roof sections being laid in said space one over the other so that the forward roof section lies between the middle roof section and the rearward roof section. The rearward roof section is pivotally connected to the body of the convertible so that it can be turned by means of a main actuator. The middle roof section, which is pivotally connected to the rearward roof section, is connected via a mechanical pivoted lever system to the body and rearward roof section of the convertible so that the middle roof section is turned together with the rearward roof section by positive control when the roof is being turned between the closed position and the open position. The forward roof section is also connected to the aforesaid mechanical pivoted lever system so that the forward roof section is turned by positive mechanical control into a position under the middle roof section, between the middle roof section and the rearward roof section, when the roof is being opened.

All the roof sections, including the forward roof section, are turned by a single actuator, i.e. a hydraulic cylinder, acting on the rearward roof section, and the turning movement of the middle roof section and forward roof section is implemented using a mechanical positive control mechanism, in other words, lever arms pivoted on each other. The problem is that this mechanism becomes very complex and expensive.

The three-section hard roof known from specification EP 0 835 778 A1 was analyzed by a computer-aided method using a kinematics program that computes the paths of movement the lever system on the basis of the mathematical position of the pivots of the lever system. A problem thus detected was that very unfavorable leverage ratios of the lever arms develop in the positive control mechanism. This results in the generation of very large stresses, due to the dead weight of the roof, on the joints of the lever system and on different structural parts of the roof and its hydraulic system. This may lead to an increased play in the joints of the mechanism, which again may produce extra noises and problems regarding the sealing of the roof. If the roof mechanism according to said specification is to be so implemented that it will not rise to an excessive height when being opened or closed, or, on the other hand, so that the roof will not interfere with passengers in the passenger compartment during the movement, then it will be very difficult to optimize the leverages of the lever system according to the specification in respect of the stresses, and particularly strong materials need to used in the roof mechanism.

A further problem with the prior-art hard roof is that, due to the arrangement of the positive control mechanism of the forward roof section, the direction of motion of the main actuating cylinder has to be reversed at a certain point during the opening and closing movement of the roof. In other words, when the roof is being opened and lowered into the stowage space by retracting the piston rod of the main actuating cylinder into the cylinder and the rearward roof section has been lowered into the stowage space while the forward and middle roof sections are directly above the stowage space, the direction of motion of the piston rod has to be reversed and the piston rod has to be pushed outwards from the cylinder to turn the forward roof section against the middle roof section and to fold down the middle roof section over the rearward roof section so that the forward roof section simultaneously turns and goes between them. In practice, it is difficult to accomplish a timely reversal of the direction of motion of the hydraulic cylinder when the roof sections are in a certain position. In conventional hydraulic systems used in roof structures, a reversal of the direction of motion of the hydraulic cylinder would require reversing the direction of rotation of the motor of a hydraulic pump, which is difficult to implement. The prior-art roof may function more or less reasonably when the roof is being lowered into the folded-down stowage position as in this situation its operation is assisted by gravitation, whereas when the roof is being raised from the folded-down position into the closed position and a situation is reached where the direction of motion of the main actuating cylinder should be reversed with unfavorable leverages prevailing at the same time, the functionability of the prior-art roof is uncertain.

Yet another problem is that, as the entire roof structure is operated by means of a single main actuating cylinder, this cylinder has to be designed to relatively large dimensions and weight.

BRIEF SUMMARY OF THE INVENTION

The object of the invention is to eliminate the above-mentioned drawbacks.

A specific object of the invention is to disclose a three-section hard roof having a structure as simple as possible, in which the turning motion of the forward roof section can be accomplished and timed independently of the operating mechanism of the rearward roof section and middle roof section so that the forward roof section can be turned in relation to the middle roof section when this is most advantageous.

As for the features characteristic of the convertible roof of the invention, reference is made to the claims.

According to the invention, the roof comprises a second actuator for turning the forward roof section in relation to the middle roof section separately and independently of positive mechanical control between the rearward roof section and the middle roof section.

The invention provides the advantage that the forward roof section can be turned by means of its own actuator, whose operation can be so adjusted that a roof completely reliable in operation is achieved. A further advantage of the invention is that the roof-actuating mechanism can be made simpler than before with fewer parts. A further advantage of the invention is that the main actuator can be designed to smaller dimensions and weight than before. Yet another advantage of the invention is that the leverages of the roof mechanism can be designed in a better way, allowing a light-construction roof to be achieved without the use of particularly strong materials. In addition, the forward roof section can be moved relative to the other roof sections during the opening and closing movements of the roof when this is most advantageous in respect of the stresses applied to the mechanism, the space utilization required by the opening and closing and in respect of the comfort of passengers present in the vehicle. A further advantage is that the main actuator needs to be operated in only one direction during the opening and closing movements of the roof.

In an embodiment of the roof, the second actuator is of a retractable/extendable type and comprises a first end, which is connected to the middle roof section, and a second end, which is connected to the forward roof section.

In an embodiment of the roof, the forward roof section and the middle roof section are pivotally connected to each other via a swivel joint. The roof comprises an actuating lever pivotally connected to the forward roof section at a distance from the swivel joint and pivotally connected to the middle roof section at a distance from the swivel joint. One end of the second actuator is pivotally connected to the actuating lever.

In an embodiment of the roof, the roof comprises a control lever, which is pivotally connected to the middle roof section at a distance from the swivel joint and pivotally connected to the actuating lever at a distance from the pivot between the actuating lever and the forward roof section, so that the pivots of the forward roof section, middle roof section, actuating lever and control lever together form a joint quadrangle mechanism.

In an embodiment of the roof, the second actuator is a hydraulic cylinder. The hydraulic cylinder comprises a piston rod pivotally connected to the actuating lever and a cylinder tube pivotally connected to the middle roof section. In another embodiment, the second actuator may be e.g. a torque motor. The second actuator may also consist of any other type of actuator known in itself, operated by a pressure medium or electricity and working in a linear or revolving manner.

In an embodiment of the roof, the second actuator has been arranged to turn the forward roof section into a position under and opposite to the middle roof section when the rearward roof section and middle roof section have been turned into a position where the rearward and middle roof sections are substantially above the boot so that the forward roof section can turn in the space behind and above the passenger compartment without interfering with the passengers.

In an embodiment of the roof, the forward roof section, the middle roof section and the rearward roof section are substantially of the same size so that, when folded one over the other, they take up a space substantially the size required by the length of one roof section.

BRIEF DESCRIPTION OF THE DRAWINGS

In the following, the invention will be described in detail by the aid of a few examples of its embodiments with reference to the attached drawing, wherein.

DETAILED DESCRIPTION OF THE INVENTION

Figure 1:
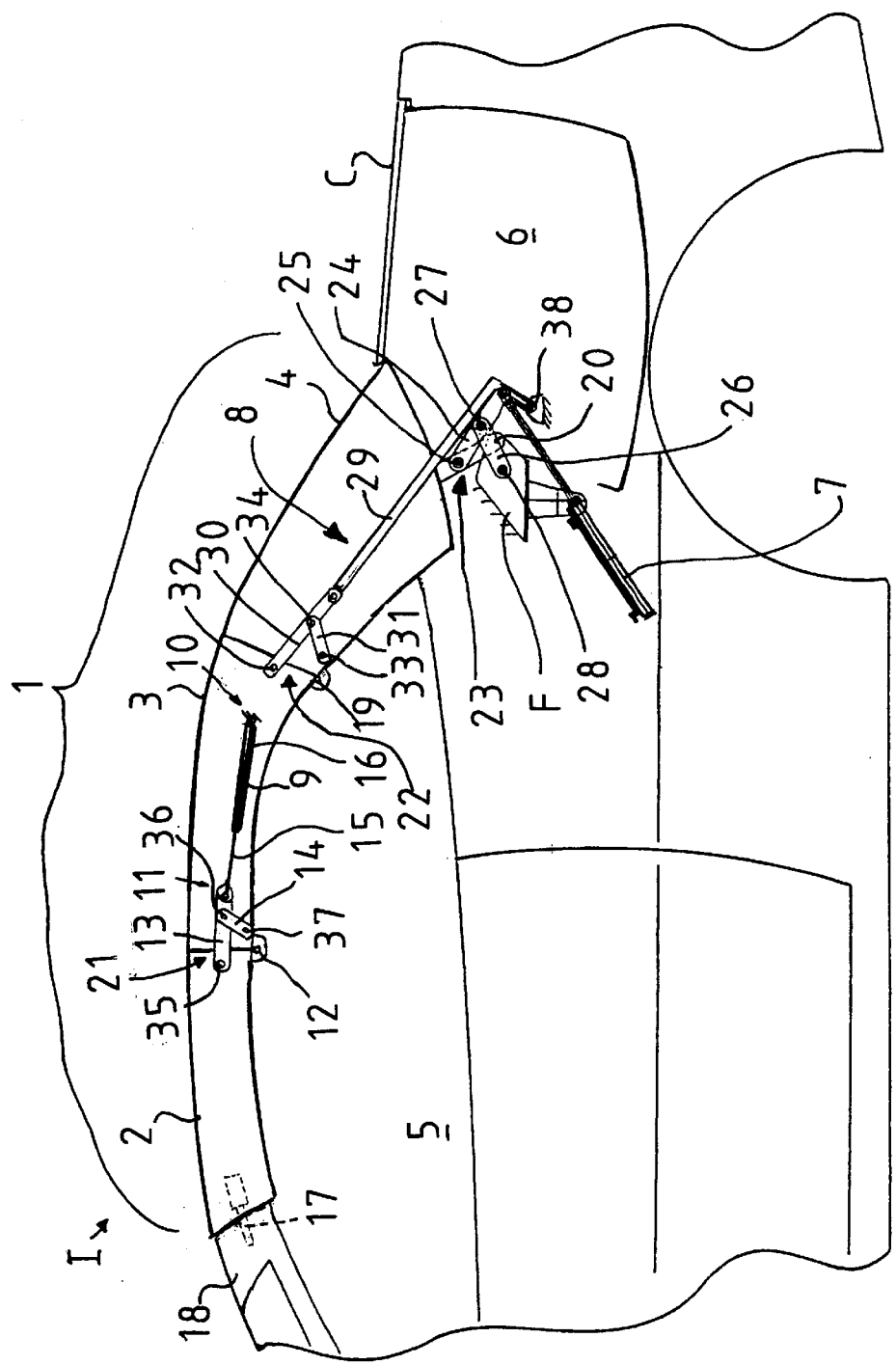
FIG. 1 presents a diagrammatic side view of a part of a convertible provided with an embodiment of the roof of the invention, with the roof in the closed position.

FIG. 1 presents a convertible provided with a openable hardtop roof 1. In the figure, the roof 1 is in a closed first position I, in which the roof extends over the passenger compartment 5 of the car.

Figure 4:
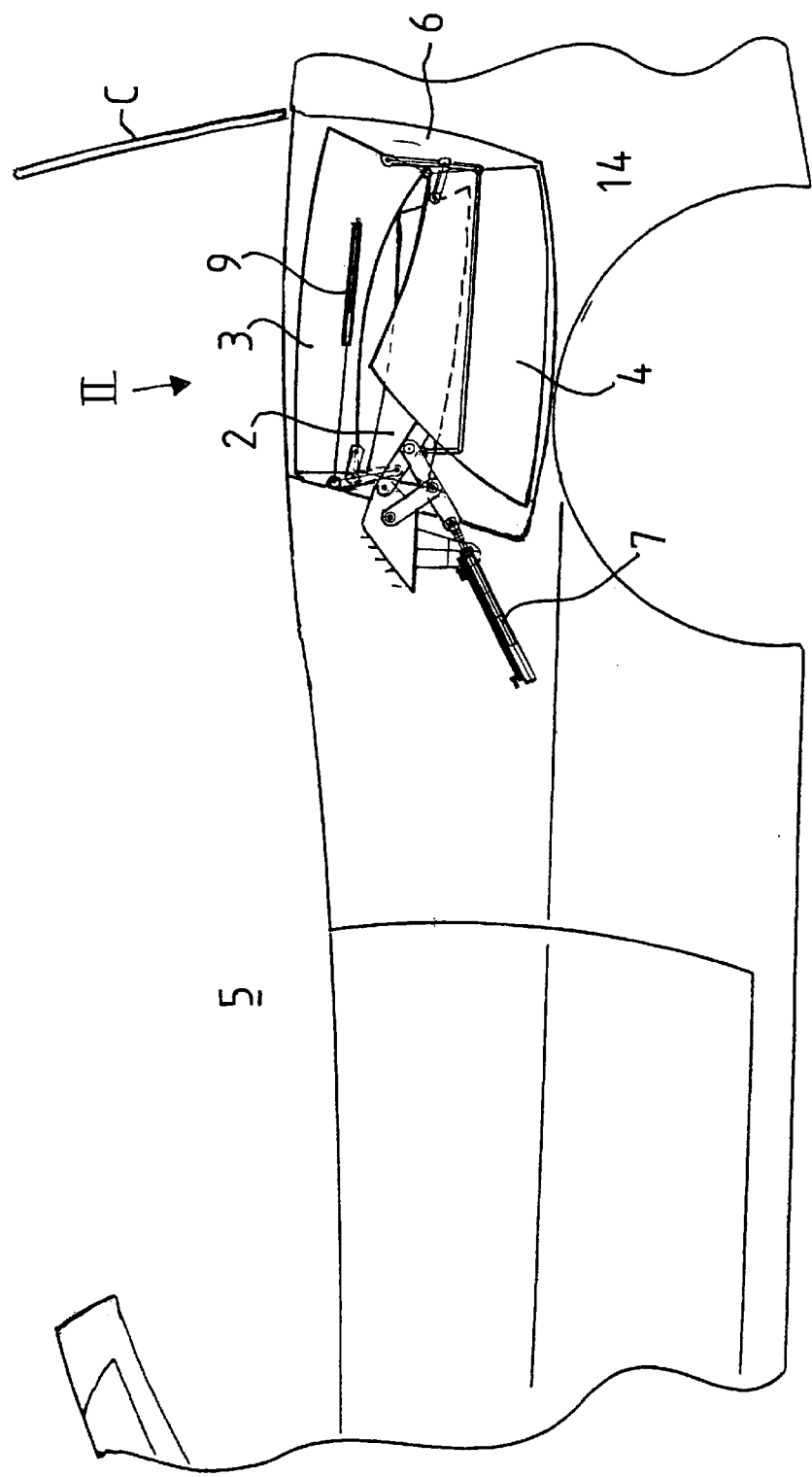
FIG. 4 presents the convertible of FIG. 1 with the roof in the opened position in a roof stowage space.

In FIG. 4, the roof 1 is in an opened position II, having been turned down from above the passenger compartment 5 and lowered into a roof stowage space 6 located behind the passenger compartment 5, in which space 6 the roof sections 2, 3, 4 are placed one upon the other with the forward roof section 2 stowed between the middle roof section 3 and the rearward roof section 4. The stowage space 6 is covered with an openable lid C.

Further referring to FIG. 1, the roof 1 comprises three roof sections made of a substantially rigid material, arranged in succession in the longitudinal direction of the car. These are a forward roof section 2, a rearward roof section 4 and a middle roof section 3 placed between them. The free end of the forward roof section 2 is provided with a locking device 17 to allow the roof to be releasably locked to the windscreen frame 18. The forward roof section 2 is pivotally hinged by its rear end on the front end of the middle roof section 3 by means of a swivel joint 12 whose swivel axis is perpendicular to the longitudinal direction of the vehicle. All the other joints in the lever mechanisms of the roof described below also have swivel axes perpendicular to the longitudinal direction of the vehicle. The middle roof section 3 is hinged by its rear end on the front end of the rearward roof section 4 via a second swivel joint 19. The rearward roof section 4 is pivotally hinged via a third swivel joint 20 by its rear end on the body of the vehicle or on a part F fixedly connected to it.

To accomplish a controlled turning movement of the roof, the turning motion of the roof sections 2, 3, 4 about the swivel joints 12, 19 and 20 is controlled by joint quadrangle mechanisms 21, 22 and 23.

The turning motion of the rearward roof section 4 about the swivel joint 20 is controlled by two torsion levers, one 24 of which is pivoted via joint 25 on a bar fixed to the rearward roof section 4, said joint 25 being located at a distance from the third swivel joint 20, while the other torsion lever 26 is pivotally connected via joint 27 on torsion lever 24 at a distance from joint 25 and, on the other hand, pivotally connected via joint 28 on the body of the vehicle or to a part F fixedly connected to it. Joints 20, 25, 27 and 28 constitute the joints of a joint quadrangle 23.

The roof 1 is turned by means of a main actuator 7, i.e. a hydraulic cylinder 7, whose piston rod is connected to an extension of torsion lever 24 extending to a distance from joint 27. The opening and closing movements of the roof 1 are effected by operating the hydraulic cylinder 7.

The middle roof section 3 is pivotally connected via swivel joint 19 to the rearward roof section 4 and connected to the body of the convertible and to the rearward roof section 4 via a mechanical pivoted lever system 8 producing a positively controlled kinematic chain so that the middle roof section 3 is turned by positive mechanical control together with the rearward roof section 4 when the roof is being turned by means of the main actuator 7 between the opened position I and the closed position II. The pivoted lever system 8 comprises a push-pull rod 29, which is pivotally connected by its lower end to the vehicle body at a point behind the third swivel joint 20, at a distance from it. Moreover, the pivoted lever system 8 comprises torsion levers 30 and 31 forming a second joint quadrangle mechanism 22. Torsion lever 30 is pivotally connected to the middle roof section 3 via a joint 32 located at a distance from the second swivel joint 19. The upper end of the push-pull rod 29 is pivotally connected to torsion lever 30. The turning motion of torsion lever 30 is controlled by torsion lever 31, which is pivotally connected to the middle roof section 3 via a joint 33 located at a distance from the second swivel joint 19 and likewise to torsion lever 30 via a joint 34 located at a distance from joint 32. Joints 19, 32, 33, 34 constitute the joints of a joint quadrangle mechanism 22.

To produce the turning motion of the forward roof section 2 relative to the middle roof section 3, a second actuator 9 is provided, which is a hydraulic cylinder 9 attached to the second roof section 3. Its first end 10 is connected to the middle roof section 3 and its second end 11 is connected to the forward roof section 2. The second actuator 9 turns the forward roof section 2 in relation to the middle roof section 3 separately and independently of the positive mechanical control determined by the pivoted lever system 8 between the rearward roof section 4 and the middle roof section 3. To produce the turning motion of the forward roof section 2, the forward roof section 2 is provided with an actuating lever 13 pivotally connected to it via a joint 35 located at a distance from swivel joint 12. The second end 11 of the second actuator 9 is pivotally connected to the actuating lever 13. To control the turning motion of the actuating lever 13, a control lever 14 is provided, which is pivotally connected to the actuating lever 13 via a joint 36 located at a distance from joint 35. The control lever 14 is also pivotally connected to the middle roof section 3 via a joint 37 located at a distance from the first swivel joint 12. The joints constitute the first joint quadrangle mechanism 21.

Figure 2:
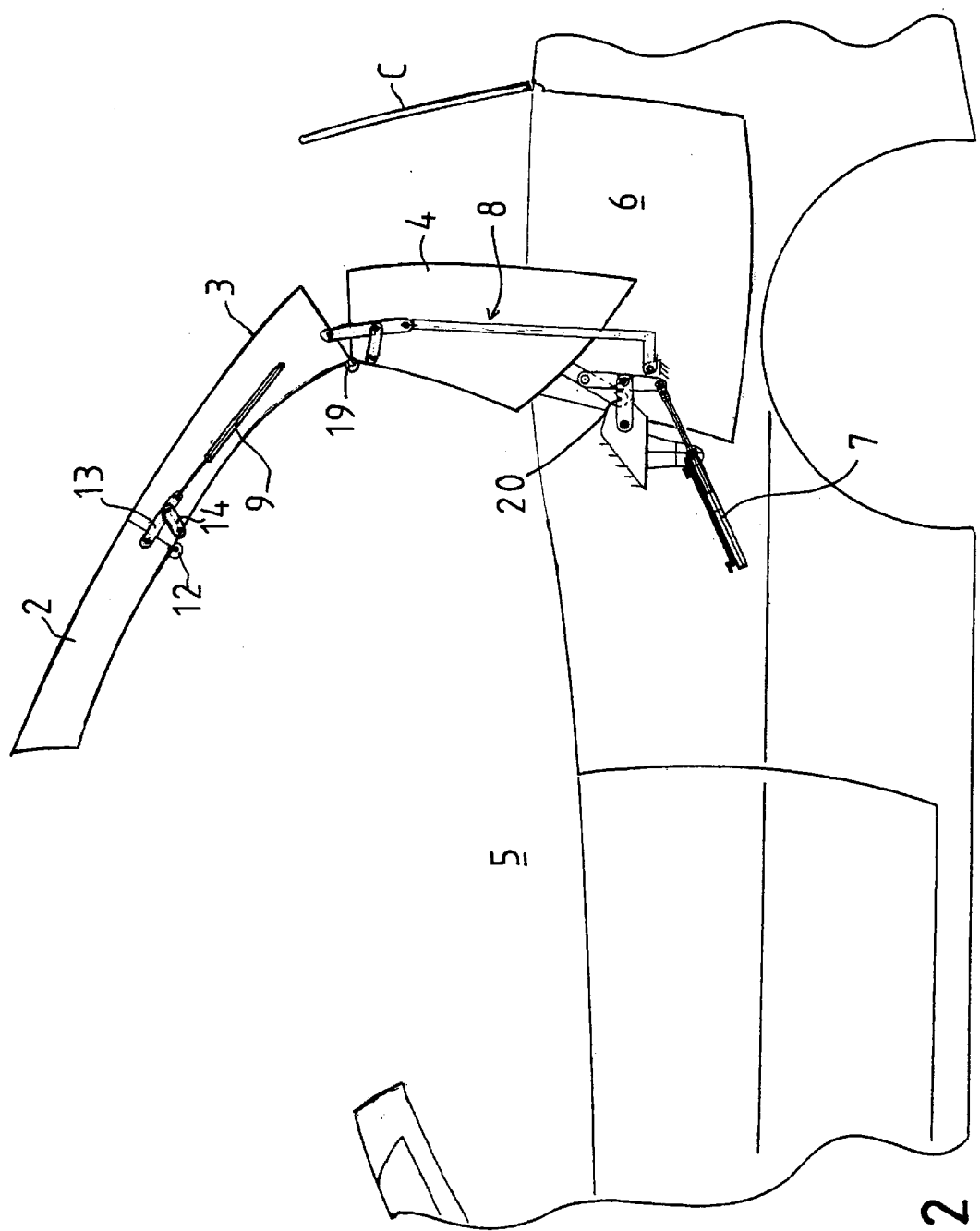
FIGS. 2 and 3 present the convertible of FIG. 1 with the roof at different stages of movement while the roof is being opened.
Figure 3:
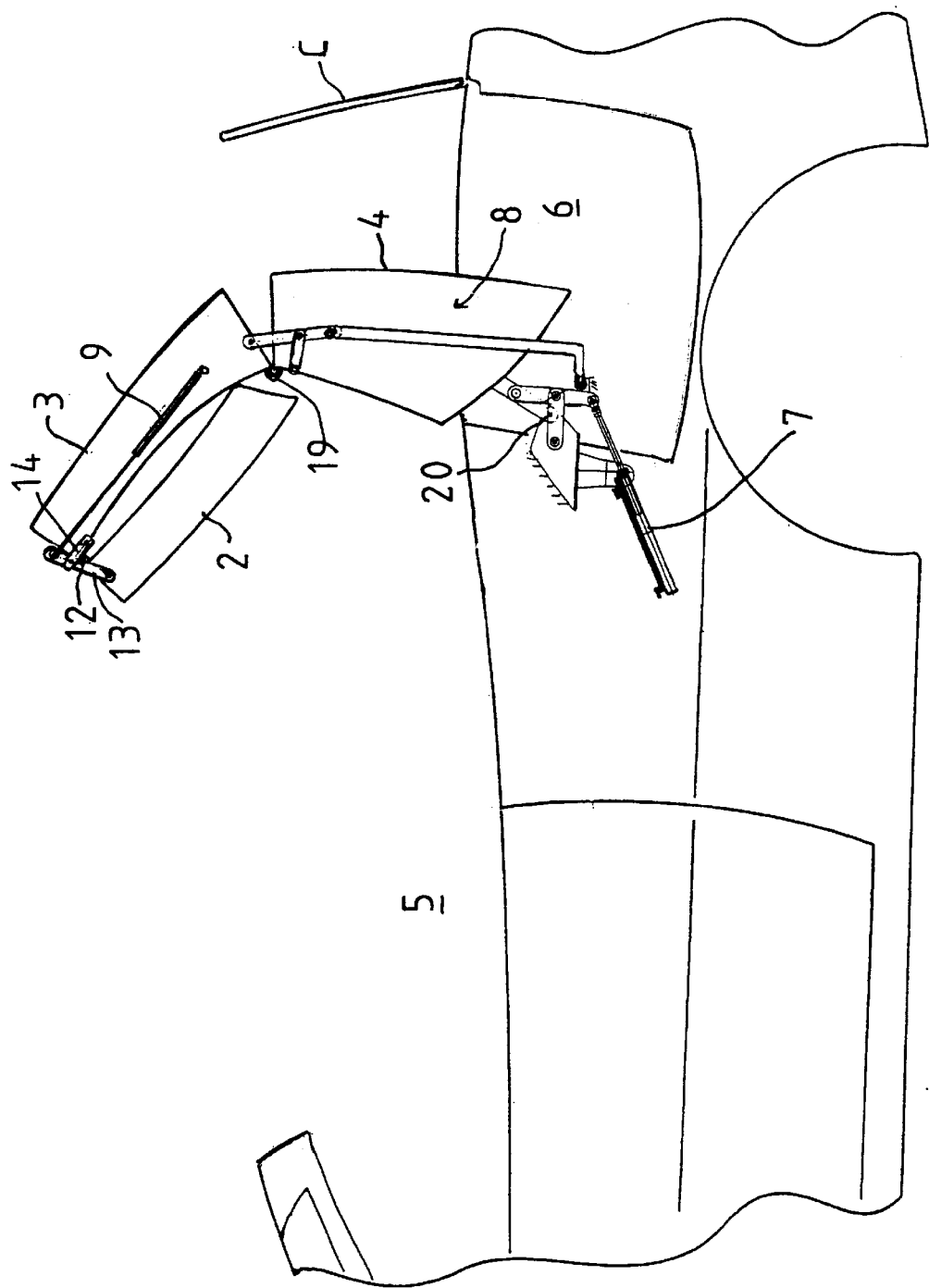

In FIG. 2, the roof 1 has been raised by means of the main actuating cylinder 7, which in the example in this figure has been retracted by about one half of its stroke so that the rearward and middle roof sections 3, 4 are above the rear part of the passenger compartment 5 substantially near the roof stowage space 6. In this example, when the roof is in the position shown in FIG. 2, the second actuator 9 is activated to turn the forward roof section 2 downwards under the middle roof section 3 so as to bring it to a position opposite to the middle roof section 3 as shown in FIG. 3. The turning motion of the roof 1 is continued by operating the main actuator 7, with the result that the roof is packed into the stowage space 6 as illustrated in FIG. 4 so that the middle roof section 3 and the forward roof section 2 are folded down onto the rearward roof section 4, which remains bottommost, the forward roof section 2 being stowed between the middle and rearward roof sections 3, 4.

The forward roof section 2, middle roof section 3 and rearward roof section 4 are substantially of the same size so that these three roof sections 2, 3, 4, when folded down one upon the other, take up a space substantially the size required by the length of one roof section in the stowage space 6. After the roof has been packed as illustrated in FIG. 4, the lid C of the stowage space 6 can be closed.

The invention is not restricted to the examples of its embodiments described above; instead, many variations are possible within the inventive idea defined in the claims.

What is claimed is:

1. Roof (1) of a convertible, divided into three substantially rigid roof sections, a forward roof section (2), a middle roof section (3) and a rearward roof section (4), hinged on each other in succession in the longitudinal direction of the vehicle and arranged to be movable between a closed position (I), in which the roof sections (3, 3, 4) cover the passenger compartment (5) of the convertible, and an opened position (II) with the roof folded down in a stowage space (6) behind the passenger compartment, into which position the roof sections (2, 3, 4) are folded down one upon the other from their position above the passenger compartment, the forward roof section (2) being stowed between the middle roof section (3) and the rearward roof section (2), and which rearward roof section (4) is pivotally connected to the body of the convertible so as to be turnable by means of a main actuator (7), and which middle roof section (3) is pivotally connected to the rearward roof section (4) and connected via a mechanical pivoted lever system (8) to the body and the rearward roof section of the convertible so that the middle roof section is turned by positive control together with the rearward roof section when the roof is being turned between the closed position (I) and the opened position (II), characterized in that the roof is provided with a second actuator (9) for turning the forward roof section (2) in relation to the middle roof section (3) separately and independently of the positive mechanical control between the rearward roof section and the middle roof section.

2. Roof as defined in claim 1, characterized in that the second actuator (9) is of a retractable/extendable-type construction and comprises a first end (10), which is connected to the middle roof section (3), and a second end (11), which is connected to the forward roof section (2).

3. Roof as defined in claim 2, characterized in that the forward roof section (2) and the middle roof section (3) are pivotally connected to each other via a first swivel joint (12); and that the roof comprises an actuating lever (13) pivotally connected to the forward roof section (2) at a distance from said swivel joint (12); and that the second end (11) of the second actuator (9) is pivotally connected to the actuating lever (13).

4. Roof as defined in claim 3, characterized in that the roof comprises a control lever (14) which is pivotally connected to the middle roof section (3) at a distance from the swivel joint (12) and pivotally connected to the actuating lever (13) at a distance from the pivot between the actuating lever (13) and the forward roof section (2) so that the pivots of the forward roof section, middle roof section, actuating lever and control lever together form a joint quadrangle mechanism.

5. Roof as defined in claim 1, characterized in that the second actuator (9) is a hydraulic cylinder.

6. Roof as defined in claim 5, characterized in that the hydraulic cylinder (9) comprises a piston rod (5) pivotally connected to the actuating lever (13) and a cylinder tube (16) pivotally connected to the middle roof section (3).

7. Roof as defined in claim 1, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

8. Roof as defined in claim 1, characterized in that the forward roof section (2), the middle roof section (3) and the rearward roof section (4) are substantially the same size so that, when folded one over the other, these three roof sections take up a space substantially the size required by the length of one roof section.

9. Roof as defined in claim 2, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

10. Roof as defined in claim 3, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

11. Roof as defined in claim 4, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

12. Roof as defined in claim 5, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

13. Roof as defined in claim 6, characterized in that the second actuator (9) has been arranged to turn the forward roof section (2) into a position under and opposite to the middle roof section (3) when the rearward roof section and middle roof section have been turned into a position where the rearward and middle roof sections are above the rear part of the passenger compartment substantially near the roof stowage space (6).

14. Roof as defined in claim 2, characterized in that the forward roof section (2), the middle roof section (3) and the rearward roof section (4) are substantially the same size so that, when folded one over the other, these three roof sections take up a space substantially the size required by the length of one roof section.

15. Roof as defined in claim 3, characterized in that the forward roof section (2), the middle roof section (3) and the rearward roof section (4) are substantially the same size so that, when folded one over the other, these three roof sections take up a space substantially the size required by the length of one roof section.

16. Roof as defined in claim 4, characterized in that the forward roof section (2), the middle roof section (3) and the rearward roof section (4) are substantially the same size so that, when folded one over the other, these three roof sections take up a space substantially the size required by the length of one roof section.

17. Roof as defined in claim 5, characterized in that the forward roof section (2), the middle roof section (3) and the rearward roof section (4) are substantially the same size so that, when folded one over the other, these three roof sections take up a space substantially the size required by the length of one roof section.

18. Roof as defined in claim 6, characterized in that the forward roof section (2), the middle roof section (3) and the rearward roof section (4) are substantially the same size so that, when folded one over the other, these three roof sections take up a space substantially the size required by the length of one roof section.

19. Roof as defined in claim 7, characterized in that the forward roof section (2), the middle roof section (3) and the rearward roof section (4) are substantially the same size so that, when folded one over the other, these three roof sections take up a space substantially the size required by the length of one roof section.

20. Roof as defined in claim 13, characterized in that the forward roof section (2), the middle roof section (3) and the rearward roof section (4) are substantially the same size so that, when folded one over the other, these three roof sections take up a space substantially the size required by the length of one roof section.

* * * * *